Jan. 5, 1971             T. DOYLE             3,553,023

FUEL CELL GAS REVERSAL METHOD AND SYSTEM

Filed Oct. 24, 1966

INVENTOR
TIMOTHY DOYLE

BY Finnegan & Henderson

ATTORNEYS

3,553,023
FUEL CELL GAS REVERSAL METHOD AND SYSTEM

Timothy Doyle, Annapolis, Md., assignor to United Aircraft Corporation, East Hartford, Conn., a corporation of Delaware
Filed Oct. 24, 1966, Ser. No. 589,049
Int. Cl. H01m 27/00
U.S. Cl. 136—86      18 Claims

ABSTRACT OF THE DISCLOSURE

A system for periodically reversing the direction of flow of a reactant gas through a fuel cell to prevent a local drying-out of the cell in the region adjacent the inlet end of the cell.

---

Figure 1:
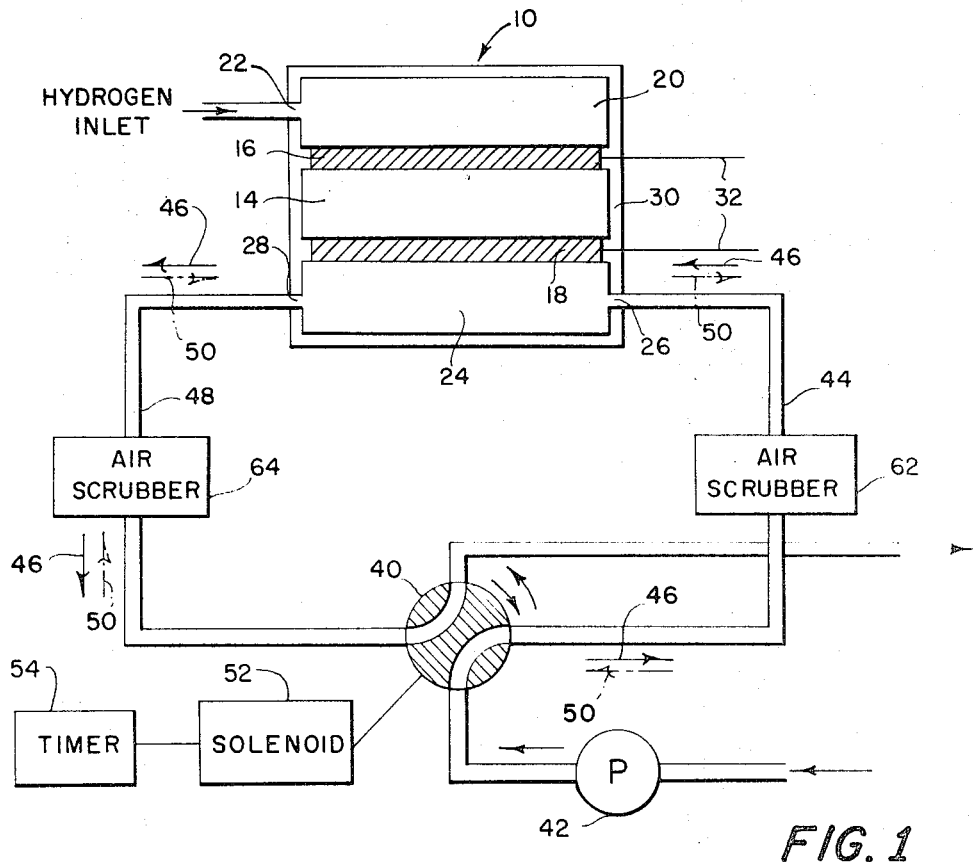

A fuel cell is generally composed of a pair of electrodes having an aqueous solution of an electrolyte disposed between and in contact with each of them. One of these electrodes is a fuel electrode and the other an oxidant electrode. In operation, a fuel gas, for example hydrogen, is supplied to the fuel electrode by suitable fuel gas supply means and an oxidant gas, for example oxygen or air, is simultaneously supplied to the oxidant electrode by suitable oxidant gas supply means.

In a hydrogen-oxygen system of this type, the following overall water-forming, electrical-current generating reaction occurs in the cell:

$$H_2 + \tfrac{1}{2} O_2 \rightarrow H_2O + \text{electrical energy} + \text{heat}$$

This overall cell reaction is actually a result of subreactions which occur at both of the cell electrodes. In these subreactions, oxygen supplied to the cell reacts with water of the electrolyte at the oxidant electrode of the cell (the cathode) accepting electrons generated at the cell anode and forming negatively charged hydroxyl ions. These ions migrate through the aqueous electrolyte to the fuel electrode of the cell (the anode) where they react with the hydrogen supplied to the cell, forming water, giving up electrons and evolving heat. The electrons generated at the anode travel to the cathode through an external circuit between the electrodes, thereby producing the desired current flow of the cell.

In the typical fuel cell of the trapped electrolyte type the electrolyte is dispersed between and within the porous cell electrodes by capillary forces. The reactant gas-electrolyte interface is located within each electrode, with the particular location of these interfaces being determined by the pressure under which the reactant gases are supplied and the concentration of the electrolyte. In certain types of fuel cells, for example Bacon-type cells, the interface position is normally controlled by reactant gas pressure, but in other types of cells, for example in compact cells, this position is generally controlled by the electrolyte concentration.

In either of these two types of cells it is important that each reactant gas-electrolyte interface be maintained within the porous electrode to prevent direct contact in the cell between the reactant gases.

Excess water is produced in the cell reaction, and it must be continuously removed from the system to maintain the aqueous electrolyte at a uniform concentration throughout the cell. Conventionally, this excess product water is removed either by evaporating it into the oxidant gas stream passing through the oxidant gas chamber adjacent the cathode, or by evaporating it into an excess hydrogen stream recirculated through the fuel gas chamber adjacent the anode. To so maintain the gas-electrolyte interface and thus to maintain the separation between the reactant gases, it is necessary to control the water balance of the cell so that the rate of removal of the product water is no greater than the rate of production of water due to the cell reactions. Maintenance of the water-balance is particularly important in compact cells because the amount of water present in the cell relates directly to electrolyte concentration.

If water is removed from the cell too rapidly, a drying of the cell occurs that forces the electrolyte-gas interface further into the cell and eventually destroys the liquid separation of the gas reactants. When leakage of the fuel gas into the oxidant gas supply stream of the cell occurs, after the electrolyte has become incapable of separating the two reactant gases, cell failure quickly follows. Such direct contact between the gases produces a gas-to-gas reaction with no generation of current and with a severe overheating of the cell.

Not only is it necessary to control the rate of water removal to prevent the drying-out problems described above, but such control is also necessary to prevent flooding of the cell. A sufficient rate of water removal thus must be provided to continuously eliminate excess water from the cell. If flooding occurs, electrolyte spills out of the cell altering the location of the electrolyte-gas interface and reducing the performance of the cell.

Because of "drying-out" problems it has previously not been possible to use dry atmospheric air as the oxidant reactant gas in fuel cells utilizing hydrogen-air reactant gas systems. In such cells the dry air removes water from the cell unevenly and too rapidly, dehydrating the cell and causing it to fail in operation. More specifically, as the dry air passes through the cell, it absorbs product water, and as it becomes more saturated it has a lesser tendency to absorb additional product water. This tendency produces a high evaporation rate of product water near the air inlet and a low evaporation rate near the air outlet of the cell.

The variation in absorption rate across the cell in turn produces a "drying" near the cell inlet and a "wetting" near the cell outlet, and a resulting electrolyte concentration gradient across the cell. Depending on the severity of this concentration gradient, the drying of the cell near the inlet can cause the gas-electrolyte interface to retreat into the cell from its position within the electrode, thereby reducing the performance of the cell and eventually destroying hte liquid separation of the gas reactants.

To prevent this local drying effect, it has been generally necessary to include in the fuel cell system means for increasing the humidity of the air before it enters the cell. Conventionally, a saturator is placed in the air feed line to supply the necessary moisture to the air. Such saturators effectively prevent local drying of the cell inlet, but they also undesirably add to the weight, complexity and cost of the fuel cell system, since they require not only a source of water but complex control and cooling systems necessary to maintain the close tolerance temperature gradient that is needed across the cell.

The problems created by the need for this additional equipment are particularly acute in space vehicles or the like where fuel cells are often used as a source of power, since increased weight of equipment and controls is highly undesirable in such vehicles.

Another problem which is encountered in air-consuming fuel cells is that carbon dioxide, which is inherently present in air, has a deleterious effect on the operation of the cell, and should be removed from the air prior to its entry into the cell. Thus, if an aqueous solution of an alkali metal is used as the cell electrolyte, it can react with the carbon dioxide to form an insoluble carbonate which can block the electrode pores, thereby disturbing the gas-electrolyte interface and reducing the performance of the cell.

Carbon dioxide is conventionally removed with a soda-lime scrubber through which the air passes before entering the fuel cell. The scrubbing agent is inexpensive and is capable of reducing the carbon dioxide content of atmospheric air to a safe level of less than ten (10) parts per million at a capacity of 750–1000 pounds of air per pound of soda-lime. However, the effectiveness of the soda-lime as a carbon dioxide remover is directly dependent upon the presence of moisture in the influent air to the fuel cell.

At low air humidities the absorptive capacity of the soda-lime scrubber is greatly reduced and if dry air is used in a fuel cell system, the soda-lime scrubbing agent rapidly becomes ineffective for further carbon dioxide absorption. Saturators were used in the prior art to supply sufficient moisture to the influent air to the fuel cell to ensure successful operation of the carbon dioxide scrubber, but, as pointed out above, this created other significant problems.

Accordingly, to overcome the foregoing problems and to avoid the disadvantages in prior art attempts to solve them, it is a primary object of this invention to provide a new and improved fuel cell system that can effectively utilize dry reactant gas streams and can effectively remove product water from the cell without drying-out the cell.

A further object of this invention is to provide a method and system to prevent "local drying" near the reactant gas inlet of a fuel cell and to prevent the establishment of an electrolyte concentration gradient across the cell resulting from uneven removal of product water from the cell.

Another object of this invention is to provide a new and improved fuel cell system that can effectively utilize a dry oxidant reactant gas stream, such as dry atmospheric air.

An additional object of this invention is to reduce the total weight and cost of a fuel cell while increasing its overall efficiency of operation.

Another object of this invention is to eliminate the use of saturators in fuel cell systems utilizing dry oxidant gas streams such as dry atmospheric air.

A further object of this invention is to provide a method and system which eliminates the need for complex control systems necessary to establish and maintain precise temperature gradients across a fuel cell.

Yet another object of this invention is to provide a fuel cell that can operate satisfactorily on dry air without local drying near the cell inlet, or undue wetting or flooding near the cell outlet.

A further object of this invention is to provide an improved method for scrubbing carbon dioxide from a dry reactant gas stream to a fuel cell.

Another object of this invention is to provide a method and system for removing carbon dioxide from dry influent air flowing to the oxidant electrode of a fuel cell.

A further object of this invention is to provide a method and system for maintaining soda-lime carbon dioxide scrubbers at a continuously acceptable level of absorptive capacity in a fuel cell system which utilizes dry air as a reactant gas, without having to provide means for humidifying the air prior to its entry into the fuel cell.

A still further object of this invention is to provide an improved compact, trapped electrolyte fuel cell that can satisfactorily operate on dry atmospheric air as its oxidant reactant gas without local drying and without the establishment of an electrolyte concentration gradient across the cell.

Additional objects and advantages of the invention will be set forth in part in the description which follows and in part will be obvious from the description or may be learned by practice of the invention, the objects and advantages being realized and attained by means of the instrumentalities and combinations particularly pointed out in the appended claims.

To achieve the foregoing objects and in accordance with its purpose, as embodied and broadly described, the fuel cell system of this invention comprises a pair of electrodes—a fuel electrode and an oxidant electrode—having an electrolyte disposed between the electrodes. The fuel cell is provided with means for supplying fuel reactant gas to the fuel electrode and with means for supplying oxidant reactant gas to the oxidant electrode. The gas supply means, in accordance with this invention includes gas reversal means for periodically reversing the direction of flow of at least one of the reactant gases through the fuel cell to prevent a drying-out of the cell.

This invention also provides an improved method for operating a fuel cell on dry reactant gas without causing undue drying-out of the cell, which method comprises feeding fuel reactant gas to the fuel electrode and oxidant reactant gas to the oxidant electrode of a conventional fuel cell and periodically reversing the direction of flow of at least one of the reactant gases through the cell.

In accordance with the above method and system, dry atmospheric air (or any other suitable dry reactant gas) can be used without the necessity of treating it to increase its humidity. In prior art cells when dry air was used, undesirable concentration gradients formed across the cells, because the dry air, which flowed in one direction through the cells, produced a greater drying effect near the air inlet than near the air outlet. By periodically reversing the direction of flow of the reactant gas through the cell in accordance with this invention, it has been found that the drying and wetting characteristics of the cell can be eliminated, thereby substantially minimizing the concentration gradient across the cell and the resultant performance difficulties and failures attributable to the establishment of a concentration gradient.

The present invention periodically converts the outlet for the reacant gas stream, which is the wetter end of the cell, to the inlet, which is the drier end of the cell. By this means, the evaporation rate of product water into the reactant gas stream is substantially equalized across the cell, reducing the establishment of a concentration gradient.

Although the air-reversal means of this invention does not operate instantaneously, the concentration gradients in the electrolyte are also formed over a period of time because of the volume of electrolyte, and therefore the reversal means and step of this invention are effective to substantially prevent these gradients from forming. This invention accordingly maintains the concentration of the electrolyte at a constant and acceptable level across the cell.

The reversal step of the method of this invention serves an additional important function when air is used as the oxidant gas. In this case, it is necessary, to provide a scrubber to remove the carbon dioxide from the reactant air, and the periodic reversal step of this invention continuously regenerates these carbon dioxide scrubbers to an acceptable level of absorptive capacity. Thus, in accordance with this invention, scrubbers are provided in the fuel cell system on either side of the fuel cell.

In operation atmospheric air is passed through the upstream scrubber, where its carbon dioxide content is substantially reduced. Then the scrubbed air is passed through the fuel cell, and moist exit air from the fuel cell, containing the product water removed from the cell, is passed through the downstream scrubber. This regenerates that scrubber for subsequent use when the direction of flow is reversed. This regeneration greatly increases the carbon dioxide removal capacity of the entire system without requiring humidification of the air prior to its entry into the fuel cell.

The invention consists in the novel parts, constructions, arrangements, combinations and improvements as shown and described.

The accompanying drawings which are incorporated in and constitute a part of this specification, illustrate various embodiments of the invention and, together with the description, serve to explain the principles of this invention.

Figure 2:
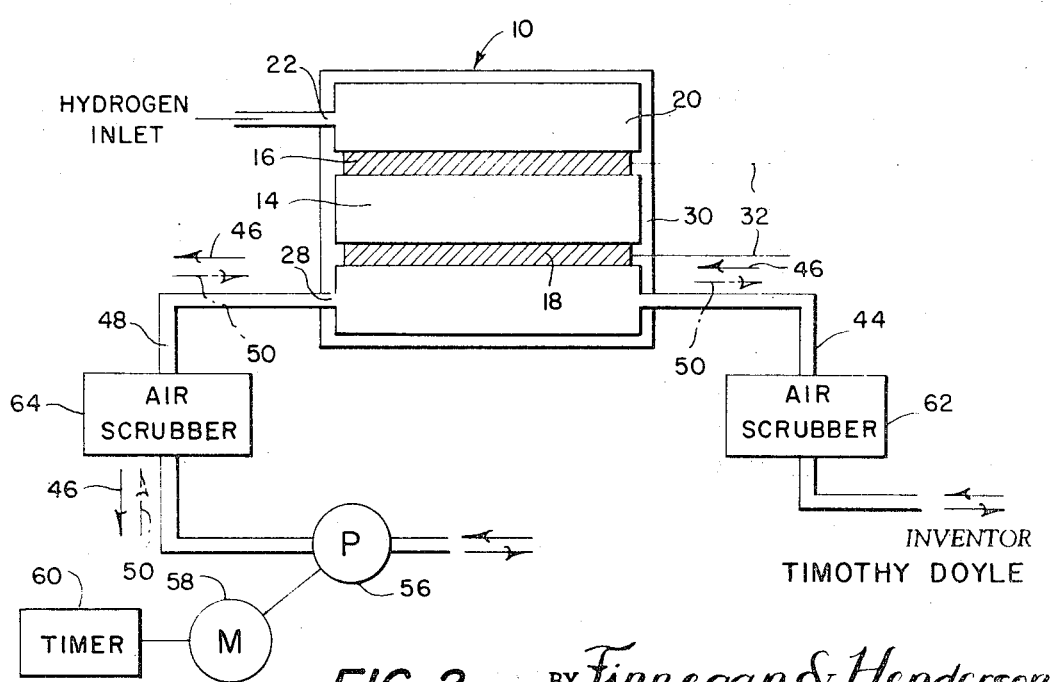

Of the drawings:

FIG. 1 is a diagrammatic view of a compact, "trapped electrolyte" fuel cell system incorporating the novel features of this invention; and FIG. 2 is a diagrammatic view of an alternative embodiment of such a fuel cell sysetm incorporating the novel features of this invention.

It is to be understood that both the foregoing general description and the following detailed description are exemplary and explanatory but are not restrictive of the invention. Reference will now be made in detail to a preferred embodiment of the invention, an example of which is illustrated in the accompanying drawings.

As shown in FIG. 1, the fuel cell of this invention is a single compact hydrogen-air fuel cell, generally indicated at 10, having an electrolyte impregnated in a matrix 14 located between spaced electrodes 16 and 18. The hydrogen electrode or anode 16 is positioned between matrix 14 and an anode gas chamber 20 into which hydrogen gas is delivered through an inlet 22. The oxidant electrode or cathode 18 is positioned between matrix 14 and a cathode gas chamber 24. The air or other oxidant gas stream is directed into chamber 24 through an inlet 26 and exits the chamber through an outlet 28.

For illustrative purposes only, a single fuel cell is shown in the drawings, but it is to be understood that the invention is equally applicable to a multi-cell unit constructed of a plurality of individual fuel cells.

Preferably, the fuel cell is a low-temperature, compact fuel cell designed to operate on hydrogen and dry air at a temperature between about 150 to 200° F., preferably at about 170° F., and at a gas pressure of about 1–7 p.s.i.g. The compact fuel cells of the trapped electrolyte type utilize a porous matrix impregnated with the electrolyte which has a thickness of approximately ten (10) to twenty (20) mils. The single porosity catalyzed screen electrodes on either side of the matrix have a thickness of about six (6) to ten (10) mils. This close spacing of the electrodes provides a compact cell configuration.

Referring further to FIG. 1 the fuel cell is located with preferably single porosity catalyzed screen electrodes are insulated from one another. The electrodes are electrically connected through external leads 32. The fuel cell housing 30 also serves to render the cell gas-tight.

In accordance with the invention, an oxidant electrode and a fuel electrode are provided. These electrodes are preferably single porosity catalyzed screen electrodes pressed against the porous matrix containing the electrolyte. The matrix may suitably be of asbestos or any porous nonconducting material that is compatible with the electrolyte and can maintain the bubble pressure between the reactant gases. The electrolyte dispersed in the matrix transfers ions formed by the electrode reactions from one electrode to the other, thereby forming a conducting path between the electrodes and establishing the desired current flow.

Aqueous solutions of alkali metal hydroxides are greatly preferred as electrolytes in the fuel cells of this invention, and a preferred electrolyte is composed of about 30 percent potassium hydroxide (KOH) in an aqueous solution. Any alkali metal hydroxide, however, can be substituted for potassium hydroxide as the electrolyte, including sodium hydroxide (NaOH), rubidium hydroxide (RbOH), cesium hydroxide (CsOH), and lithium hydroxide (LiOH).

When alkaline solutions are used as the electrolyte, the electrodes are preferably constructed of nickel, but the invention is also applicable to fuel cells employing acidic electrolyte soutions in which the screen electrodes are preferably constructed of tantalum.

Referring again to FIG. 1, when dry atmospheric air is pumped into oxidant gas chamber 24 of cell 10 in a given direction (indicated, for example, by arrows 46) through inlet 26 and exhausted through outlet 28, a higher evaporation rate of the product water into the air stream will occur near the cell air inlet 26. This higher evaporation is due to the difference in the partial pressure of the water vapor between electrolyte and the air stream, forcing evaporation of the product water into the air stream. The evaporation rate near outlet 28 is less because the air stream at that point has a greater water vapor partial pressure resulting from its higher moisture content. Thus, less water will be removed near the outlet 28 than near the inlet 26 of the cell.

The result of such dry air flow in a single direction is the establishment of a concentration gradient in the electrolyte matrix from one end of the cell to the other. The higher concentration of electrolyte, of course, occurs near the air inlet 26 because of the more rapid water removal there. This change in concentration creates a "local drying" near the cell inlet and causes the eletrolyte-gas interface in the electrode to retreat further into the cell resulting in reduced cell performance. As this condition intensifies and the electrolyte-air interface retreats further into the cell, it will eventually meet the electrolyte-hydrogen reactant gas interface and a gas crossover will result with complete degradation of cell performance.

The process by which the cell is dried out is not reversible, since the drying-out of the cell results in the solidification of the electrolyte, thereby destroying the liquid barrier between the hydrogen and air reactant gas streams.

To eliminate the establishment of a concentration gradient in the electrolyte and to prevent local drying of the cell operating on dry atmospheric air, in accordance with the invention, means are provided for periodically reversing the direction of flow of the air stream that supplies oxygen to the fuel cell and removes the product water from the cell. By this means, any concentration gradients across the cell, established by the flow of air through the cell in one direction, can be subsequently eliminated by reversing the direction of flow which in turn reverses the drying and wetting characteristics of the air.

As embodied, this reversal means comprises a two-way valve 40 operable between a first and second position and capable of supplying air under pressure from a pump 42 through either an air line 44 or an air line 48 to oxidant gas chamber 24 of fuel cell 10. The position of the valve 40 may periodically be changed by any suitable actuating means to change the direction of flow of gas through the fuel cell—from the direction indicated in the drawings by arrows 46 to the reverse direction indicated by arrows 50, shown in phantom in the drawings. After the actuation of the reversal means, the air then flows into the cell through air line 48. In a preferred embodiment illustrated in FIG. 1, the reversal means comprises valve 40 and the actuating means for the valve is a solenoid 52 and a timer.

As further embodied, this reversal means may alternatively comprise a more simplified system such as that illustrated in FIG. 2, which comprises an air reversal pump 56, operated by a reversal motor 58. This reversal motor automatically changes the direction of rotation of pump 56 by means of a timer mechanism 60. Reversal of the direction of rotation of pump 56 reverses the direction of flow of air through air chamber 24 of fuel cell 10.

When air is used as the oxidant reactant gas in a fuel cell which utilizes an alkali metal hydroxide electrolyte, such as potassium hydroxide, carbon dioxide in the air may react with the potassium hydroxide electrolyte to form a potassium carbonate precipitate in the electrodes, thereby reducing the performance of the cell. Because of this condition, it is desirable to remove the carbon dioxide from the air stream before it is used in the fuel cell. Soda-lime scrubbers are now in extensive use for this purpose and are capable of reducing the carbon dioxide content of the feed air to less than 10 p.p.m. from atmospheric air.

The carbon dioxide is removed by an absorption process which occurs in the soda-lime bed of the scrubber, with the gas being passed up through the bed of the scrubber. The scrubbing agent is used up as the carbon dioxide is removed from the air, and this depletion of the scrubbing capacity is indicated by a color indicator included with the soda-lime which turns from white to blue as the reaction zone or front moves up the absorption bed. At a low air humidity, the soda-lime is rapidly expended and the absorptive capacity of the bed is greatly reduced. However, the bed can be regenerated by increasing the moisture content of the air introduced into the scrubber. Thus if moist air is used, the reaction zone remains at an acceptable level in the bed and the scrubber continues to efficiently remove carbon dioxide from the influent air to the fuel cell.

In the prior art, the use of saturators to eliminate local drying in the cell incidentally supplied the required air humidity to permit satisfactory operation of the scrubbers. The present invention avoids the use of saturators as a means of supplying the required humidity. Thus, in accordance with this invention, means are provided for removing carbon dioxide from dry inlet air without having to humidify or saturate the air prior to its entry into the fuel cell.

As embodied, this means comprises two scrubbers 62 and 64 located in air feed lines 44 and 48, respectively, as shown in FIGS. 1 and 2. By this scrubber system and by reversing the flow of air through the fuel cell according to the teachings of this invention, it is possible to prevent the absorptive capacity of scrubbers 62 and 64 from being unduly depleted even though dry amtospheric air is used in the system.

Since the soda-lime scrubbing agent can be regenerated by passing moist air through it, the air-reversal step of this invention affords the additional benefit of effecting such regeneration. Thus, when dry air is passed through fuel cell 10 in the direction as shown by arrows 46 in FIGS. 1 and 2, upstream scrubber 62 removes carbon dioxide from the dry air while downstream scrubber 64 is being regenerated by the moist exit air from the fuel cell, i.e., the air containing absorbed product water. This regeneration prepares scrubber 64 for use when the direction of flow of the air stream is subsequently reversed, by rotating the valve 40 to its second operating position in the embodiment shown in FIG. 1 or by reversing the direction of rotation of pump 56 in the embodiment shown in FIG. 2. The air then flows through scrubber 64 in the direction indicated by arrows 50 prior to its passage through the fuel cell.

By using scrubbers, in parallel, as shown in FIGS. 1 and 2, it is possible, by alternating the flow of the reactant air stream, to use dry unconditioned air in the fuel cell without rapidly expending the capacity of the scrubbing agent. The novel system of this invention thereby affords longer life to the soda-lime charge of a conventional soda-lime scrubber.

While soda-lime scrubbers have been specifically discussed in connection with this invention, it is to be understood that any conventional scrubber system regenerable by the addition of moisture to the scrubbing agent can be used with the system of this invention. The scrubbing agent is preferably used in pellet or powder form. A suitable agent, for example, is granular soda-lime having a seven (7) to fourteen (14) mesh screen particle size. A liquid scrubbing agent also may be used, and potassium hydroxide is an excellent example.

In operation and as best shown by reference to the drawings, oxygen, air, or other suitable oxygen-containing gas mixture is fed to oxidant gas chamber 24 through air line 44 and inlet 26 and pure hydrogen or other suitable fuel is fed to fuel gas chamber 20 through fuel inlet 22. The dry inlet air is scrubbed of carbon dioxide in its passage through soda-lime scrubber 62 prior to reaching inlet 26. After entering chamber 24 the oxidizing gas diffuses through porous oxidant electrode 18 and comes into contact with the electrolyte (such as, for example, a 30 percent aqueous solution of KOH), which is dispersed throughout matrix 14, forming an oxidant-electrolyte interface within electrode 18.

The electrolyte also contacts the fuel (such as, for example, hydrogen or the like), which has diffused through fuel electrode 16 from fuel chamber 20, forming a fuel-electrolyte interface within electrode 16.

The electrolyte thereby establishes conducting paths between the reactions occurring in the oxidant electrode and those occurring in the fuel electrode, transporting the hydroxyl ions formed at cathode 18 to anode 16 where these ions react with the hydrogen to form water and produce the electrical output of the cell.

The oxygen depleted air stream passes out of oxidant gas chamber 24, through outlet 28, removing product water produced in the fuel cell reaction. After exiting the chamber this moist gas passes through soda-lime scrubber 64 regenerating the scrubbing agent which has been depleted by previous carbon dioxide absorption.

After a predetermined interval of time has elapsed the direction of the air flow is reversed either by changing the position of valve 40 through the automatic actuating means afforded by timer 54 and solenoid 52 as shown in FIG. 1, or by reversing air pump 56 as shown in FIG. 2. After this reversal the dry air is transported through air line 48 in the direction indicated by arrows 50 to the scrubber 64 where its carbon dioxide content is reduced. The dry air then enters chamber 24 through "inlet" 28, picking up moisture in its passage across the cell, and exits from the chamber through "outlet" 26. The moist exiting air then passes through scrubber 62 regenerating it for additional carbon dioxide absorption when the direction of air flow is subsequently reversed.

For a clearer understanding of the invention, specific examples of it are set forth below. These examples are merely illustrative and are not to be understood as limiting the scope or underlying principles of the invention in any way.

EXAMPLES

The improvement achieved by the present invention is clearly illustrated by the following examples. These examples establish that satisfactory operation of the fuel cell can be achieved using dry unconditioned air as the oxidant reactant gas; and that product water produced by the cell reactions can be removed from the system without "drying-out" the cell by periodically reversing the direction of flow of the dry air through the cathode air chamber. The cells used in these tests were of the type illustrated in FIG. 1. They used air as an oxidizing gas and pure hydrogen as the fuel. Reactant gases were supplied at a pressure of about five (5) to seven (7) p.s.i.g. A resistance load was connected between the external circuits of the electrodes of the cell, and the power output of the cell was measured with voltmeters and ammeters.

The cells used were compact, low-temperature, trapped electrolyte cells operating preferably at about 170° F. The electrolyte used was an aqueous solution of about 30 percent KOH. Each individual cell was provided with an asbestos matrix separating the electrodes and having a thickness of about three-hundredths of an inch. This matrix was impregnated with the electrolyte solution. Each electrode was surrounded by a gas chamber so that only the face of each electrode was in contact with the electrolyte. The electrodes were of fine mesh nickel screen having a thickness of about .06 inch. The electrodes included a platinum catalyst dispersed in a Teflon binder and pressed onto the surface of the screen.

In these tests the fuel cell was operated for an extended period of time, and the direction of flow of the air through the fuel cell was reversed every three (3) minutes.

The cell was tested for endurance for a period of 325 hours under a load having a current density of 100 amperes per square foot, and during that time the voltage output of the cell remained constant at about 0.75 volt, varying only between 0.70 and 0.80 volt during the entire period.

At various intervals during this endurance test (at the end of 107 hours, 217 hours, 308 hours and 325 hours of operation) the load was varied to certain specific values indicated in Table 1 to test the performance of the cell by observing the variation in cell voltage at each current density.

As shown in Table 1 cell performance remained relatively constant throughout the tests at each of the current densities used.

TABLE 1

| Current density (amperes/square foot) | Cell voltage at varying test times (volts) after— | | | |
|---|---|---|---|---|
| | 107 hrs. | 217 hrs. | 308 hrs. | 325 hrs. |
| 0 | .94 | .90 | .95 | .95 |
| 13 | .90 | .88 | .95 | .90 |
| 26 | .88 | .86 | .87 | .87 |
| 51 | .84 | .83 | .82 | .83 |
| 77 | .81 | .78 | .77 | .78 |
| 102 | .78 | .75 | .72 | .75 |
| 128 | .75 | .72 | .67 | .71 |
| 146 | .73 | .70 | | .67 |

Also during this endurance testing, the cell was periodically subjected to extended periods of open circuit operation (i.e., with the cell under no load and at a current density of zero) with the circuit remaining open for several days during each of these periods. Successful restart of the cell was readily achieved after each period of open circuit operation.

After the above described testing was completed, in an effort to determine the effectiveness of the air reversal system of this invention, air reversal was discontinued and the dry air allowed to flow in one direction only through the oxidant gas chamber. After only thirteen (13) minutes of such operation a gas crossover occurred as evidenced by detection of hydrogen in the air stream exiting the fuel cell.

It can be seen from the above description that by reversing the direction of flow of the dry air stream in accordance with the method and system of this invention, a decrease in the weight and complexity of the overall fuel cell system is achieved over the prior art systems which necessarily included a saturator to add moisture to the influent air to the fuel cell. Furthermore, the air reversal system of this invention is particularly well adapted to overcome local drying problems in the cell, since the inlet port of the cell—which tends to dry out fastest under a unidirectional flow of the air—becomes the wettest portion of the cell when the direction of flow of the air is reversed, thereby equalizing water removal from the cell.

Furthermore, the air reversal system provides a method for regenerating soda-lime scrubbers; consequently providing greater carbon dioxide removal capacity and eliminating the rapid scrubber exhaustion problem heretofore encountered in scrubbing dry influent reactant gas streams to fuel cells.

The invention has been described primarily for use with a compact fuel cell, where the local drying effect and the resulting establishment of a concentration gradient is most critical, because the location of the gas-electrolyte interface is directly dependent upon the electrolyte concentration. It is to be understood, however, that the invention is not limited to compact cells and can also be used on other types of fuel cells, such as, for example, a Bacon-type cell operating at an intermediate temperature range of from about 350 to 500° F. by the reaction of hydrogen with either oxygen or air. Thus, while the invention permits the use of single porosity electrodes, with the concentration of the electrolyte controlling the location of the gas-electrolyte interface, it is to be understood that the invention in its broadest form also contemplates the use of the more sophisticated biporous electrodes normally used in Bacon-type cells.

Further, although the above description has dealt primarily with reversal of the direction of flow of the oxidant reactant gas to the fuel cell, it is to be understood that the method and system of this invention can also be used with the fuel reactant gas stream to prevent drying of the cell when the fuel reactant gas is used to remove product water from the cell.

The invention in its broader aspects is not limited to the specific details shown and described, but departures may be made from such details within the scope of the accompanying claims without departing from the principles of the invention and without sacrificing its chief advantages.

What is claimed is:

1. A fuel cell having a porous fuel electrode, a porous oxidant electrode, a porous matrix containing aqueous electrolyte disposed between and in contact with the electrodes, means for supplying fuel reactant gas containing hydrogen to the fuel electrode, and means for supplying oxidant reactant gas containing oxygen to the oxidant electrode, one of said reactant gas supply means including a gas chamber adjacent its electrode for distributing the flow of reactant gas over the electrode, said chamber having two opposite ends, and gas reversal means operably connected to the ends of the chamber for periodically reversing the direction of flow of the reactant gas through the chamber from one end to the other end.

2. A fuel cell having a porous fuel electrode, a porous oxidant electrode, a porous matrix containing aqueous electrolyte disposed between the electrodes, means for supplying fuel gas to the fuel electrode, and means for supplying air to the oxidant electrode, the air supply means including an air chamber adjacent the oxidant electrode for distributing the flow of air over the electrode, said chamber having two opposite ends, and air reversal means operably connected to the ends of the chamber for periodically reversing the direction of flow of the air through the chamber from one end to the other end.

3. The fuel cell of claim 2, in which the air reversal means comprises a two-pass valve having two operating positions, the first operating position being adapted to pass the air through the chamber in a given direction and the second operating position adapted to pass the air through the chamber in a direction opposite said given direction, said valve having means for selectively moving the valve between said operating positions.

4. The fuel cell of claim 2, in which the air reversal means comprises a reversal pump adapted to force the air through the chamber of the fuel cell in a given direction and alternatively to pull the air through the chamber in a direction opposite said given direction, said air reversal means being provided with means for periodically reversing the direction of rotation of the pump, thereby reversing the direction of flow of the air.

5. The fuel cell of claim 2, in which the air chamber has a first port at one end of said chamber and a second port at the other end of said chamber, said cell being provided with two scrubbers, adapted to remove carbon dioxide from the dry air before it is passed through the chamber, one of said scrubbers being located at each end of the chamber and disposed between the port at that end of the chamber and the air reversal means.

6. The fuel cell of claim 5, in which the scrubbers utilize a soda-lime scrubbing agent.

7. A compact fuel cell designed to operate at temperatures of from 150 to 200° F. by the reaction of hydrogen and air, said compact cell having a fuel electrode, an oxidant electrode, an aqueous alkali-metal hydroxide electrolyte impregnated matrix disposed between and in contact with the electrodes, means for supplying hydrogen to the fuel electrode, and means for supplying dry reactant gas to the oxidant electrode, said air supply means comprising an air chamber adjacent the oxidant electrode through which the air is circulated, said air chamber having two opposite ends, and air reversal means operably connected to the ends of the chamber for periodically reversing the direction of flow of the dry air through said chamber from one end to the other end.

8. The fuel cell of claim 7, in which the electrolyte is an aqueous solution of potassium hydroxide.

9. The fuel cell of claim 7, in which the electrolyte is impregnated in a porous asbestos matrix.

10. The fuel cell of claim 7, which has catalyzed nickel screen electrodes.

11. The fuel cell of claim 8, in which the electrolyte is about a 30 percent solution of potassium hydroxide.

12. A method for preventing the drying-out of a fuel cell having a porous fuel electrode, a porous oxidant electrode and a porous matrix containing aqueous electrolyte disposed between and in contact with said electrodes, the method comprising flowing fuel reactant gas containing hydrogen through a fuel gas chamber adjacent the surface of the fuel electrode to establish an electrolyte-fuel gas interface in the fuel electrode, flowing oxidant reactant gas containing oxygen through an oxidant gas chamber adjacent the surface of the oxidant electrode to establish an electrolyte-oxidant gas interface in the oxidant electrode, one of said reactant gases being capable of removing product water from the cell and periodically reversing the direction of flow of said product water removal reactant gas through its chamber to alternate the inlet end with the outlet end of its chamber before its interface with the electrolyte retreats out of its electrode.

13. A method for preventing the drying-out of a fuel cell having a porous fuel electrode, a porous oxidant electrode, and a porous matrix disposed between and in contact with said electrodes, the method comprising flowing fuel reactant gas containing hydrogen to the fuel electrode, flowing oxidant reactant gas containing oxygen and capable of removing product water from the cell through a gas chamber adjacent the surface of the oxidant electrode to establish an electrolyte-oxidant reactant gas interface in the oxidant electrode and periodically reversing the direction of flow of the oxidant gas through said chamber to alternate the inlet end with the outlet end of the chamber before the electrolyte-oxidant reactant gas interface retreats out of the oxidant electrode.

14. The method of claim 13, wherein the oxidant gas is dry air.

15. The method of claim 14, in which the direction of the flow of air through the gas chamber is reversed about every three (3) minutes.

16. The method of claim 13, in which the oxidant gas is air and includes the step of passing the air through a scrubber to remove carbon dioxide from the air before it enters the oxidant gas chamber of the fuel cell.

17. The method of claim 16, which includes the step of regenerating the scrubber by periodically reversing the direction of flow of the air through the gas chamber and passing moist exit air from the chamber through the scrubber.

18. A method according to claim 16, in which scrubbers are soda-lime scrubbers.

References Cited

UNITED STATES PATENTS

| | | | |
|---|---|---|---|
| 411,426 | 9/1889 | Dahl | 136—86 |
| 409,365 | 8/1889 | Mond et al. | 136—86 |
| 2,901,524 | 8/1959 | Gorin et al. | 136—86 |
| 3,288,647 | 11/1966 | Beigelman et al. | 136—86 |

WINSTON A. DOUGLAS, Primary Examiner

H. A. FEELEY, Assistant Examiner

UNITED STATES PATENT OFFICE
CERTIFICATE OF CORRECTION

Patent No. 3,553,023          Dated January 5, 1971

Inventor(s) T. Doyle

It is certified that error appears in the above-identified patent and that said Letters Patent are hereby corrected as shown below:

Claim 13, column 11, line 3, after "matrix" insert -- containing aqueous electrolyte --.

Signed and sealed this 11th day of May 1971.

(SEAL)
Attest:

EDWARD M. FLETCHER, JR.
Attesting Officer

WILLIAM E. SCHUYLER,
Commissioner of Paten

FORM PO-1050 (10-69)